United States Patent Office 3,324,018
Patented June 6, 1967

3,324,018
HYDROGENATION METHOD
Peter Fotis, Jr., Highland, and John D. McCollum, Hammond, Ind., assignors to Standard Oil Company, Chicago, Ill., a corporation of Indiana
No Drawing. Filed Sept. 30, 1963, Ser. No. 312,343
14 Claims. (Cl. 204—162)

This invention relates to hydrogenation methods and particularly to catalytical homogeneous hydrogenation methods.

Transition metals in a dispersed state or supported on a suitable carrier have played an important role, and are widely used in catalytic reactions, especially such reactions involving hydrocarbons. Such catalysis is referred to as heterogeneous. In such catalysis, the catalysts are subject to coking, sintering, poisoning by adsorption and other poorly understood surface effects. Recently transition metal ions and complexes dissolved in solution have been found to have catalytic power. Solution catalysis is commonly referred to as homogeneous catalysis. Consequently the aforesaid disadvantages for heterogeneous type catalysts would not exist in reactions where the metal catalysts are in the form of a coordination complex in solution.

While a variety of metal complexes are known which activate molecular hydrogen homogeneously in solution and catalyze the reduction of some inorganic and organic substrates these have not in general proved effective catalysts for the hydrogenation of unsaturated materials under homogeneous conditions. Homogeneous catalysis requires that the homogeneous catalyst have the power to activate the unsaturated substrate as well as the hydrogen molecule and at the same time not be removed from solution through reduction. In other words the homogeneous catalyst must catalyze the hydrogenation reaction and remain stable in the liquid hydrogenation reaction medium.

It has been discovered that certain coordination complexes of iridium and osmium have the requisite activity, solubility, and stability to function as soluble homogeneous catalysts in homogeneous catalysis systems for effecting the reduction with hydrogen of unsaturated organic materials. These coordination metal complexes and their formulas are:

Trihydrido-tris(triphenylphosphine)-iridium(III), $IrH_3(P\phi_3)_3$;
Dichloro-monohydrido-tris(triphenylphosphine)-iridium III), $IrHCl_2(P\phi_3)_3$;
Dichloro-monohydrido-tris(triphenylarsine)-iridium(III), $IrHCl_2(As\phi_3)_3$;
Dichloro-monohydrido-tris(triphenylstilbine)-iridium (III), $IrHCl_2(Sb\phi_3)_3$;
Chloro-carbonyl-bis(triphenyl phosphine)-iridium(I), $Ir(CO)Cl(P\phi_3)_2$;
Trihydrido-tris(triphenylphosphine)-osmium(III), $OsH_3(P\phi_3)_3$;
Dichloro-monohydrido-tris(triphenylphosphine)-osmium (III), $OsHCl_2(P\phi_3)_3$ and
Dichloro-monohydride-tris(triphenylarsine)-osmium (III), $OsHCl_2(As\phi_3)_3$.

In the above formulas the symbol $\phi$ represents the unsubstituted phenyl radical. While the prior art describes these iridium and osmium complexes and their preparation, the possibility of their use as homogeneous catalysts is not apparent from the teachings thereof. It has been found that they have unique homogeneous catalytic activity. All are specific for the addition of hydrogen to non-aromatic carbon-to-carbon unsaturation. They do not catalyze the usual olefin addition reactions with oxygen, water, ammonia, or hydrogen-carbon monoxide mixtures. Nor do they catalyze the hydrogenation of simple or polynuclear aromatic compounds, or functional groups such as ketones, aldehydes, and nitriles. Further, it has been discovered that, in addition to their selective hydrogenation catalytic activity, they are active isomerization catalysts.

Accordingly, this invention provides a novel homogeneous catalytic hydrogenation method for selectively hydrogenating non-aromatic carbon-to-carbon unsaturation in hydrogenatable organic materials. The invention also provides means for effecting isomerization of terminal olefins under homogeneous hydrogenation conditions.

Briefly, the method of the invention comprises contacting the organic material capable of undergoing hydrogenation with hydrogen in liquid phase in the presence of a catalytic amount of one of the described iridium or osmium complexes under hydrogenating conditions.

Any organic material containing non-aromatic carbon-to-carbon unsaturation, ethylenic or acetylenic, is susceptible to reduction of the unsaturated linkage with hydrogen by this method. Such material can be of natural or synthetic origin such as natural fats, oils, waxes and steroids or synthetic polymers such as polyolefins, polyacrylates, etc. Also, simple or complex unsaturated compounds such as olefinic or acetylenic hydrocarbons either unsubstituted or substituted with functional groups such as alkenes, alkynes, aralkenes, aralkynes, unsaturated alcohols, ketenes, acids, etc., can be hydrogenated in accordance with this invention. The homogeneous hydrogenation method of the invention is especially useful for reducing non-aromatic carbon-to-carbon unsaturation or effecting isomerization of such linkages in organic materials having functional groups such as hydroxyl, carbonyl, nitrile and carboxyl groups without affecting the functional groups in such materials. It is to be understood that the method of this invention is not restricted to any specific type or class of unsaturated organic material. It is applicable to the selective hydrogenation of non-aromatic carbon-to-carbon unsaturation regardless of the type of material that contains such unsaturation.

The method of this invention is conducted in the liquid phase. The soluble homogeneous iridium or osmium coordination complexes are dissolved either in the organic material, which can act as both solvent and reactant, or in an inert solvent, that is one not subject to hydrogenation, such as paraffinic or aromatic hydrocarbons, for both the material to be treated and the catalyst. Benzene is exemplary of such a solvent for olefinic hydrocarbons.

The catalytic amount of the respective iridium or osmium complexes can range from about 0.01 to about 10 weight percent, preferably from about 0.2 to 0.5 weight percent, of the material to be treated.

The reaction conditions of temperature and pressure are comparable to the usual conditions used for heterogeneous catalytic hydrogenation. Since the present method is a liquid phase reaction, the conditions can be varied broadly depending upon the material to be reacted. All that is required is that the reaction be maintained in the liquid state and below the decomposition temperatures for the catalyst, hydrogenatable material and products produced.

The mono-hydrido iridium phosphine, arsine and stilbine complexes and their preparation is described in J. Am. Chem. Soc., 83, 756. Briefly these complexes are prepared simply by heating an iridium salt and the ligand with an alcohol. An illustrative preparation of the above described mono-hydrido complexes is the following: To 0.3 g. (0.001 mole) iridium trichloride in 50 ml. ethanol (95%) were added 1.5 g. (0.006 mole) tri-phenylphosphine. The suspension was stirred while refluxing for six to ten hours. The yellow precipitate was filtered off, washed with water and ethanol and extracted with benzene. Evaporation of the benzene yielded solid, M.P. 220–230° C. (decomp.).

*Analysis.*—Calculated for IrHCl$_2$(P$\phi_3$)$_3$: Cl, 6.85%. Found: Cl, 6.8%. The osmium mono-hydrido complexes were similarly prepared.

The trihydrido iridium complex is described with a method for its preparation in J. Am. Chem. Soc., 83, 1259; and also in "Advances in the Chemistry of the Coordination Compounds," S. Kirschner, The Macmillan Co., New York, 1961, p. 475. Briefly these methods involve the reduction of the mono-hydrido complex with either sodium borohydride or lithium aluminum hydride in an oxygenated solvent. Illustrative of such preparation is the following: Two grams IrHCl$_2$(P$\phi_3$)$_3$ and 2 g. sodium borohydride were suspended in 50 ml. ethanol (200 proof) and refluxed for 10 hours. The white solid formed was filtered off, washed with water and ethanol and dried.

*Analysis.*—Calculated for IrH$_3$(P$\phi_3$)$_3$: P, 9.47%. The trihydrido osmium complex was similarly prepared.

The unique homogeneous catalytic activity of these iridium and osmium coordination complexes is illustrated in the following examples wherein hexene is used as the representative unsaturated organic material. A 6 oz. Fischer-Porter glass reactor was used for the hydrogenation reaction to provide visibility for noting the homogeneity of the reactions and whether the catalyst was decomposed. The reactor was first purged with either argon or nitrogen and then charged with a solution of the catalyst in benzene and hexene. The charged reactor was then pressured with hydrogen to the desired reaction pressure and placed in a constant temperature bath. Hydrogen was continuously introduced into the reaction medium during the duration of the reaction.

*Example I*

In this example, a solution of 0.04 g. of the mono-hydrido catalyst in 20 ml. benzene and 10 ml. of hexene-1 was charged to the reactor. The charged reactor was pressured with 50 p.s.i.g. hydrogen and placed in the constant temperature bath at 90° C. The pressure was then elevated to 75 p.s.i.g. hydrogen and maintained thereat for 2 hours. The product distribution resulting from the use of the mono-hydrido complexes is given in Table I.

TABLE I

| Catalyst | Products, volume percent | | | |
|---|---|---|---|---|
| | Hexane | trans-Hexene-2 | cis-Hexene-2 | Hexene-1 |
| IrHCl$_2$(P$\phi_3$)$_3$ | 84.1 | 12.27 | 3.67 | |
| IrHCl$_2$(As$\phi_3$)$_3$ | 65.2 | 27.75 | 6.35 | |
| IrHCl$_2$(Sb$\phi_3$)$_3$ | 24.6 | 20.3 | 16.65 | 38.5 |
| OsHCl$_2$(P$\phi_3$)$_3$ | 99.1 | 0.1 | | |
| OsHCl$_2$(As$\phi_3$)$_3$ | 75.6 | 18.4 | 6.0 | |

*Example II*

In this example, 0.049 g. of IrHCl$_2$(P$\phi_3$)$_3$, was added to 10 ml. of hexene-1 in 20 ml. of benzene in the reactor, pressured to 75 p.s.i.g. hydrogen and held for 2 hours at various temperatures. Product distribution is given in Table II:

TABLE II

| T°/C. | Products, volume percent | | | |
|---|---|---|---|---|
| | Hexane | trans-Hexene-2 | cis-Hexene-2 | Hexene-1 |
| 25 | | | | 100 |
| 90 | 84.1 | 12.27 | 3.67 | |
| 150 | 100 | | | |

*Example III*

In this example, 0.04 g. of the iridium trihydrido and carbonyl complexes and 0.02 g. of the osmium complex were used as the catalysts in 10 ml. of hexene-1 in 20 ml. of benzene. The reactions were conducted at 75 p.s.i.g. hydrogen and 90° C. for 2 hours. Results obtained are shown in Table III.

TABLE III

| Catalyst | Products, volume percent | | | |
|---|---|---|---|---|
| | Hexane | trans-Hexene-2 | cis-Hexene-2 | Hexene-1 |
| IrH$_3$(P$\phi_3$)$_3$ | 73 | 19 | 7 | 1 |
| OsH$_4$(P$\phi_3$)$_3$ | 93 | 4 | 3 | |
| Ir(CO)Cl(P$\phi_3$)$_2$ | 80 | 15 | 4 | 1 |

The iridium carbonyl complex and its preparation is described in J. Am. Chem. Soc., 83, 2784.

*Example IV*

This example illustrates the efficacy of the hydrido complexes for homogeneous catalytic hydrogenation at atmospheric pressure in the presence of ultra-violet light. Two samples of IrH$_3$(P$\phi_3$)$_3$ (4.7×10$^{-4}$ molar) in 50/50 vol. ration benzene/99 mole percent hexene-2 were prepared. Hydrogen was bubbled thru each solution at atmospheric pressure at 15° C. and kept bubbling during the experiments. Sample 1, kept in the dark, showed no detectable formation of hexane in 4 hours. Sample 2, exposed to ultra-violet visible irradiation from a Hanovia high pressure arc over a 6 hour period, showed by gas chromatography the formation of hexane at the rate of 0.001 mol per hour.

The homogeneity of these hydrogenations was evidenced by: (a) the absence of a Tyndall effect in the solution after reaction, and (b) the absence of any catalytic activity using the reactor in a subsequent blank run.

Thus, the mono- and trihydrido iridium and osmium complexes described herein are truly homogeneous catalysts and are not reduced by the hydrogenation reaction.

It will be apparent to one skilled in the art the specific hydrido iridium and osmium complexes disclosed herein are extremely useful homogeneous catalysts for use in homogeneous catalysis systems. Further, that the catalyst and reaction conditions can be varied to produce either substantially completely saturated products or an isomerized mixture of saturated and unsaturated products that can be resolved by conventional techniques.

We claim:
1. The homogeneous catalytic method for selectively hydrogenating non-aromatic carbon-to-carbon unsaturation which comprises contacting hydrogenatable organic material containing non-aromatic carbon-to-carbon unsaturation with hydrogen and a soluble homogeneous hydrogenation catalyst in liquid phase under hydrogenating conditions, said catalyst being a coordination metal complex of the group consisting of:

Trihydrido-tris(triphenylphosphine)-iridium(III),
Dichloro - monohydrido - tris(triphenylphosphine)-iridium(III),
Dichloro - monohydrido - tris(triphenylarsine - iridium(III),
Dichloro - monohydrido - tris(triphenylstilbine - iridium(III),
Chloro-carbonyl-bis(triphenyl phosphine)-iridium(I),
Trihydrido-tris(triphenylphosphine)-osmium(III),
Dichloro - monohydrido - tris(triphenylarsine) - osmium(III) and
Dichloro - monohydrido - tris(triphenylarsine) - osmium(III).

2. The method of claim 1 wherein said catalyst is trihydrido-tris(triphenylphosphine-iridium(III).

3. The method of claim 1 wherein said catalyst is dichloro - monohydrido - tris(triphenylphosphine) - iridium(III).

4. The method of claim 1 wherein said catalyst is chloro-carbonyl-bis(triphenyl phosphine)-iridium(I).

5. The method of claim 1 wherein said catalyst is trihydrido-tris(triphenylphosphine)-osmium(III).

6. The method of claim 1 wherein said catalyst is dichloro - monohydrido - tris(triphenylphosphine) - osmium (III).

7. The method of claim 1 wherein said contacting is effected in the presence of an inert solvent.

8. The method of claim 7 wherein said solvent is benzene.

9. The method hydrogenating hexene-1 which comprises contacting a liquid phase solution of hexene-1 in benzene containing about 0.2 weight percent Dichloromonohydrido-tris(triphenylphosphine)-iridium(III) with hydrogen at a temperature of from about 90 to about 150° C. and at a pressure of about 75 p.s.i.g.

10. The method of claim 1 wherein said organic material is a member of the group consisting of olefinic, polyolefinic, olefinic-acetylinic, acetylenic and polyacetylenic hydrocarbons and polymers thereof.

11. The method which comprises contacting organic material capable of undergoing hydrogenation with hydrogen in the presence of a catalytic amount of a soluble homogeneous hydrogenation catalyst in liquid phase under hydrogenating conditions, said catalyst being a coordination metal complex of the group consisting of:

Trihydrido-tris(triphenylphosphine)-iridium(III),
Dichloro - monohydrido - tris(triphenylphosphine)-iridium(III),
Dichloro - monohydrido - tris(triphenylarsine - iridium(III),
Dichloro - monohydrido - tris(triphenylstilbine - iridium(III),
Chloro-carbonyl-bis(triphenyl phosphine)-iridium(I),
Trihydrido-tris(triphenylphosphine)-osmium(III),
Dichloro - monohydrido - tris(triphenylphosphine - osmium(III) and
Dichloro - monohydrido - tris(triphenylarsine) - osmium(III).

12. The method of claim 11 where the amount of said catalyst is about 0.2–0.5 percent by weight.

13. The method of claim 11 wherein said contacting is conducted in the presence of ultra violet light.

14. The method for effecting the hydrogenation at atmospheric pressure of organic material capable of undergoing hydrogenation with hydrogen which comprises bubbling hydrogen through a liquid solution comprising said organic material, an inert solvent, and a soluble homogeneous hydrogenation catalyst, in the presence of ultra violet light at atmospheric pressure and at a temperature of from about 0 to 20° C., said catalyst being a coordination metal complex of the group consisting of:

Trihydrido-tris(triphenylphosphine)-iridium(III),
Dichloro - monohydrido - tris(triphenylphosphine)-iridium(III),
Dichloro - monohydrido - tris(triphenylarsine - iridium(III),
Dichloro - monohydrido - tris(triphenylstilbine - iridium(III),
Chloro-carbonyl-bis(triphenyl phosphine)-iridium(I),
Trihydrido-tris(triphenylphosphine)-osmium(III),
Dichloro - monohydrido - tris(triphenylphosphine - osmium(III) and
Dichloro - monohydrido - tris(triphenylarsine) - osmium(III).

References Cited
UNITED STATES PATENTS

| | | | |
|---|---|---|---|
| 3,097,153 | 7/1963 | Hubel et al. | 204—158 |
| 3,110,747 | 11/1963 | Mullineaux | 260—690 X |

FOREIGN PATENTS 490,768  8/1938  Great Britain.

JOHN H. MACK, *Primary Examiner.*

H. S. WILLIAMS, *Assistant Examiner.*